(No Model.)
W. Z. GAFFIELD.
PROPELLER SHAFT BEARING.
No. 431,690. Patented July 8, 1890.
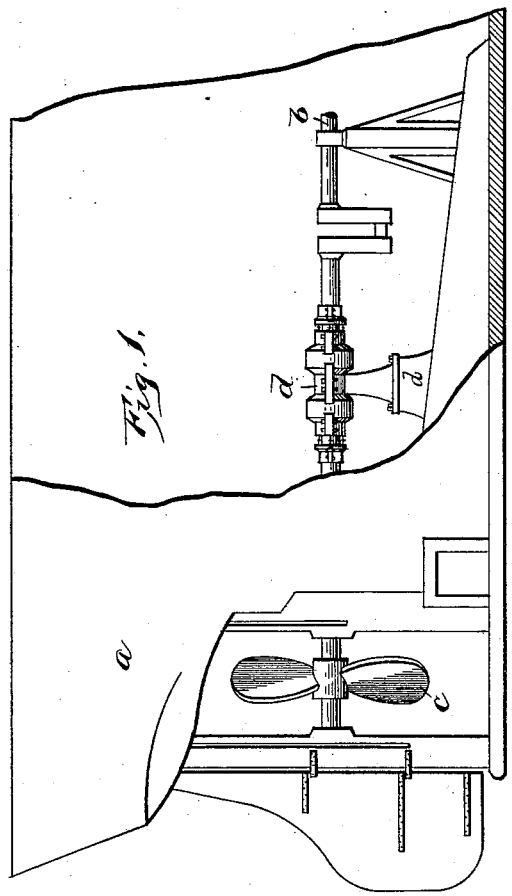
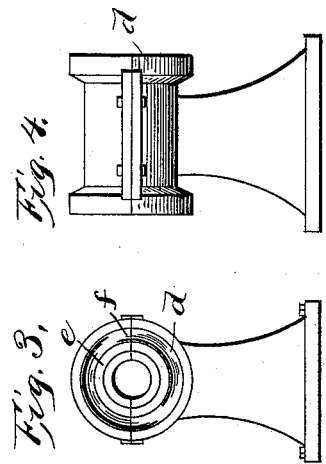
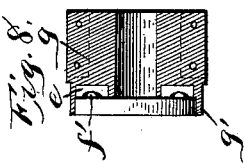
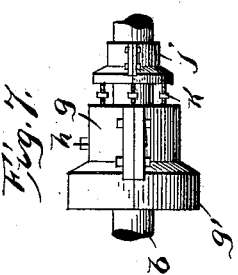
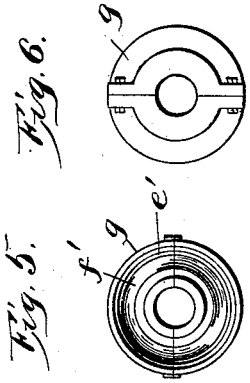
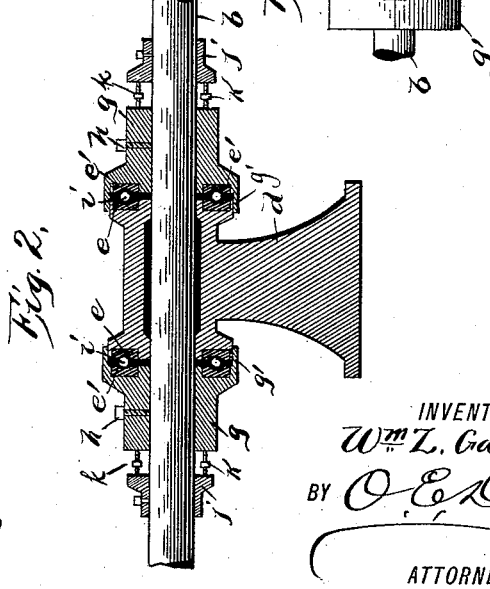
WITNESSES:
E. C. Duffy
Chas. M. Werler
INVENTOR
Wm. Z. Gaffield
BY O. E. Duffy
ATTORNEY.

UNITED STATES PATENT OFFICE.

WILLIAM Z. GAFFIELD, OF MARSHALL, TEXAS, ASSIGNOR OF TWO-THIRDS TO EDWARD VAWTERS AND CORNELIUS G. LANCASTER, OF SAME PLACE.

PROPELLER-SHAFT BEARING.

SPECIFICATION forming part of Letters Patent No. 431,690, dated July 8, 1890.

Application filed December 5, 1889. Serial No. 332,619. (No model.)

*To all whom it may concern:*

Be it known that I, WILLIAM Z. GAFFIELD, of Marshall, in the county of Harrison and State of Texas, have invented certain new and useful Improvements in Propeller-Shaft Bearings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in bearings for propeller-shafts.

The object of the invention is to provide an improved propeller-shaft bearing which will receive all thrust and strain on the shaft and hold the same rigid and true, and thereby reduce friction at all bearings; also whereby friction will be reduced to a minimum, thereby saving fuel, oil, and time, gaining power and speed, and preventing wear.

These objects are accomplished by, and my invention consists in, certain novel features of construction and in combinations of parts, more fully described hereinafter.

Referring to the accompanying drawings, Figure 1 is a longitudinal section through the stern of a vessel, showing the present invention applied thereto. Fig. 2 is a detail longitudinal section of the peculiar bearing. Figs. 3 and 4 are respectively a detached end and side elevation of the thrust-block. Figs. 5 and 6 are respectively elevations of opposite ends of one of the collars secured to the propeller-shaft. Fig. 7 is a detail elevation showing the collars on the shaft at one end of the thrust-block. Fig. 8 is an elevation of one section of a sectional collar clamped to the shaft and bearing against the thrust-block.

In the drawings, the reference-letter $a$ indicates the stern of a vessel.

The propeller-shaft $b$ is located in the vessel as usual and carries the screw or other propeller $c$. $d$ indicates a thrust or bearing block for said shaft rigidly and firmly mounted on the keelson of the vessel, whereby a firm foundation is secured. The ends of this block around the shaft are hardened, or annular steel rings $e$ are embedded in the opposite end faces of the block, and these rings or hardened ends are each provided with one or more annular grooves $f$ concentric with the propeller-shaft. A pair of collars or sleeves $g\ g$ embrace the shaft at the opposite ends of the thrust-block and are tightly clamped to the shaft to rotate therewith by set-screws $h$ or other suitable means. At their inner ends these collars are hardened or provided with embedded steel rings $e'$, corresponding and located opposite to the hardened portions or rings $e$ of the thrust-block, and these rings $e'\ e'$ are provided with annular grooves $f'$, corresponding to and located opposite grooves $f\ f$. A series of steel balls $i$ are located in said grooves $f\ f'$ and receive all strain and thrust of the shaft on the block. These grooves and the balls therein are to be of such relative dimensions that the balls can freely run or revolve in the grooves, so that but a small portion of the periphery of each ball comes in contact with the walls of the grooves, thereby reducing friction to a minimum. Each collar $g$ at its inner end is provided with an inwardly-extending annular flange $g'$. These flanges surround the inner ends of the thrust-block and the space between the ends of said block and collars, thereby protecting the walls from dust, dirt, &c.

A pair of collars $j\ j$ are rigidly clamped to the propeller-shaft at the outer ends of the collars $g\ g$, and set-screws or stud-bolts $k$ bear at their opposite ends against the adjoining faces of collars $g$ and $j$, and are adapted to take up lost motion between collars $g\ g$ and thrust-block. These collars and the thrust-block can be formed solid or separable. When a vessel is provided with this invention during construction, these parts are usually solid; but when being put on an old vessel separable parts are used, so that the vessel need not be docked. This device not only reduces friction and wear, but, the balls working parallel, keeps the shaft in line and true. In the drawings but one series of balls is shown at each end of the thrust-block; but of course as many series can be employed as deemed necessary.

This device is particularly adapted for use with propeller-shafts, but is not confined to such use.

What I claim is—

1. The combination, with the horizontal propeller-shaft, of the single central stationary thrust-block through which the shaft snugly extends, the opposite ends of said block being each flattened and provided with a circular groove concentric with the shaft, the pair of collars rigidly secured to the shaft at the opposite ends of said central block, the inner ends of said collars each having a groove corresponding with the grooves in the block, and series of balls confined and running in each set of grooves and between the collars and block.

2. The combination, with the horizontal propeller-shaft, of the central stationary thrust-block through which said shaft extends, the opposite ends of said block each having a circular groove in its outer face concentric with the shaft, and the outer faces of the ends being circular, the two similar collars rigidly secured to the shaft at opposite ends of said block, and each having its inner end formed with a groove to correspond with its end of the block, the balls running in said grooves, and the horizontal annular flanges formed with the inner ends of said collars and projecting over the ends of the block.

3. The combination of the horizontal propeller-shaft, the stationary thrust-block surrounding the shaft and formed of two longitudinal sections rigidly secured together, said block having each end flat and formed with a circular groove concentric with the shaft, the two longitudinally-separable collars rigidly secured to the shaft at the opposite ends of the block, each having a groove to correspond to the groove in that end of the block, and the balls in said grooves.

4. The combination of the propeller-shaft, the central stationary thrust-block therefor, the collars at each end of said block secured to and rotating with the shaft, balls interposed between said collars and block, and another pair of collars rigidly secured to said shaft at the outer ends of the first-mentioned collars, substantially as described.

5. The combination of the shaft, a thrust-block therefor, collars secured to said shaft at the ends of the block, balls interposed between said collars and block, another set of collars secured to the shaft at the outer ends of said first-mentioned collars, and adjusting-screws interposed between each pair of collars, for the purpose set forth.

In testimony that I claim the foregoing as my own I affix my signature in presence of two witnesses.

WILLIAM Z. GAFFIELD.

Witnesses:
    TOM A. BELL,
    WILLIAM L. MARTIN.